Dec. 20, 1960  F. BÜSSE  2,965,744
METHOD OF AND APPARATUS FOR PRODUCING A FINNED TUBE
Filed Feb. 27, 1958  4 Sheets-Sheet 1
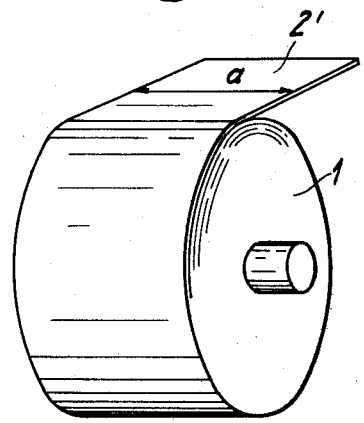
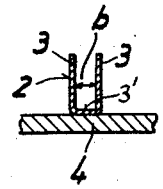
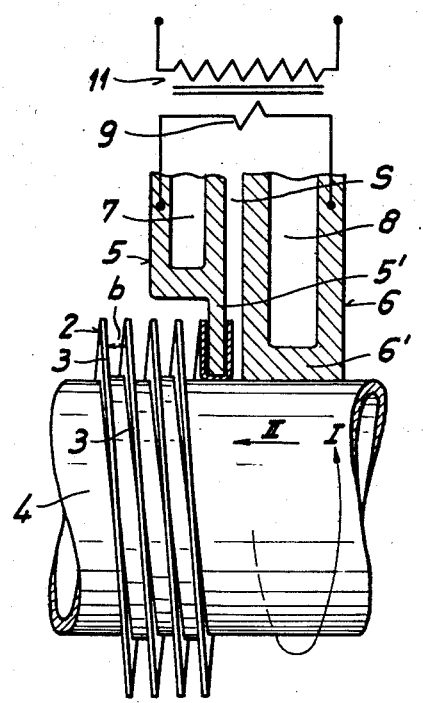
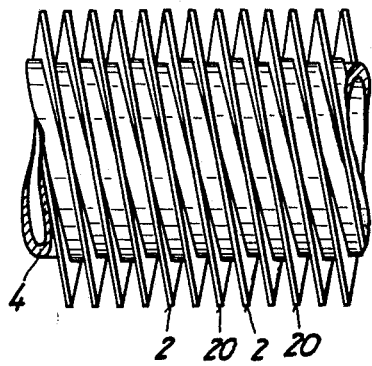
INVENTOR:
FERDINAND BÜSSE
By Silverman, Mullin + Coss
HIS ATTORNEYS.

Dec. 20, 1960 F. BÜSSE 2,965,744
METHOD OF AND APPARATUS FOR PRODUCING A FINNED TUBE
Filed Feb. 27, 1958 4 Sheets-Sheet 2

INVENTOR:
FERDINAND BÜSSE
BY Silverman, Mullin + Cass
HIS ATTORNEYS.

Dec. 20, 1960          F. BÜSSE          2,965,744
METHOD OF AND APPARATUS FOR PRODUCING A FINNED TUBE
Filed Feb. 27, 1958                    4 Sheets-Sheet 3
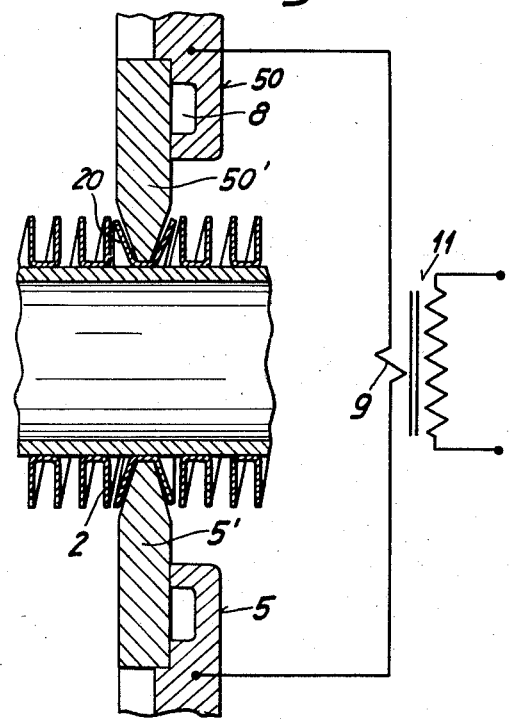
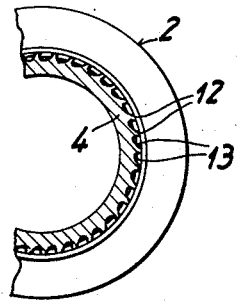
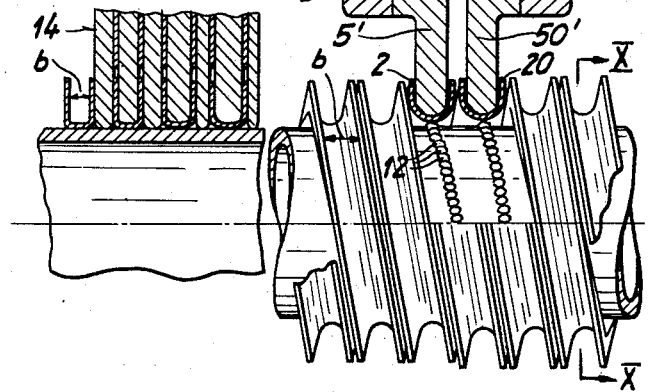
INVENTOR:
FERDINAND BÜSSE
BY Silverman, Mullin + Cass
HIS ATTORNEYS.

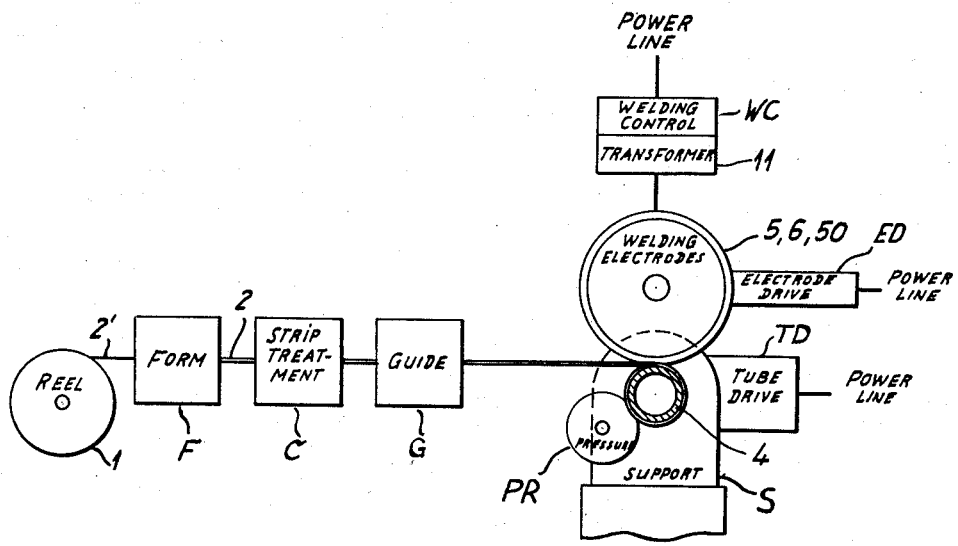

United States Patent Office 2,965,744
Patented Dec. 20, 1960

2,965,744

METHOD OF AND APPARATUS FOR PRODUCING A FINNED TUBE

Ferdinand Büsse, Planegg, near Munich, Germany

Filed Feb. 27, 1958, Ser. No. 718,037

Claims priority, application Germany Nov. 4, 1957

20 Claims. (Cl. 219—107)

This invention relates generally to heat exchanger apparatus and more particularly is concerned with a novel and improved method of and apparatus for producing a heat exchanger element in the form of a finned tube.

So far as I am aware, until the advent of my invention there has never been a method of or apparatus for manufacturing finned tubing of extremely high thermal efficiency in a continuous process which was economical and enabled the tubing to be produced at high speed. In other words, there has been substantially no adaptation of so-called high speed production line technique to the manufacture of finned tubing.

The primary object of this invention, therefore, is the provision of a novel and improved method of and apparatus for producing finned tubing of extremely high thermal efficiency at a high rate of speed, and in a continuous operation.

Maximum thermal efficiency of an extended surface heat exchanger is achieved only when the extended surfaces are homogeneously connected with the primary surface either by virtue of having been formed from the same body of material or by virtue of efficient bonding of the extended surface to the primary surface. Such maximum thermal efficiency is a requirement in many installations, such as for example in heat exchangers for gas-cooled atomic power plants where the operating temperatures are high, and the amount of heat which is to be transferred is great, thus calling for considerable heat transfer surface. High thermal efficiency enables savings in space as well as expense, but heat exchangers of this type in which the extended surfaces are formed by machining, rolling or extrusion offset some of these advantages by virtue of high cost.

Other prior extended surface tubular heat exchangers and methods of manufacturing the same have been subject to numerous disadvantages of one kind or another. In one type of structure, the secondary heat exchanger surfaces were provided by means of disks applied to the tube. The expense and slow production required by this method are obvious. Another method utilized helical strips applied to the tubes by tightly enwrapping the same upon the tube or shrinking the same in place. The difficulty with this method was that it has not heretofore been possible to achieve a perfectly homogeneous or intimate connection between the strip and the tube, especially if such tubes were to be in use for some time.

Still a further method which utilized substantially U-shaped strips of metal required that these strips be welded to the tubing parallel with its axis along its length. Obviously there would have to be a plurality of such strips positioned circumferentially about the tube, rendering the production difficult and expensive, in addition to creating unfavorable thermal conditions. Another disadvantage of this type of structure was that the maximum transfer of heat is achieved by directing the external fluid or gas transverse of the primary surface, that is, at right angles relative to the tubing and hence, also normal to the longitudinal strips, resulting in resistance to flow of the medium. The U-shaped longitudinal strips described can only be attached by intermittent welding, thereby providing undesirable temperature gradients and contact resistance at non-homogeneous junctures.

An important object of the invention is to provide a novel and improved method of homogeneously welding a continuous U-shaped strip of metal to a tube in helical configuration and in one pass, whereby to provide a highly efficient heat exchanger which eliminates all of the disadvantages enumerated above.

It has been suggested in the past to helically secure a U-shaped metal strip to a tube for producing a heat exchanger with finned extended surfaces, but this has been described as a two-step process not capable of providing a structure of high thermal efficiency, and hence has never been commercially accepted, to the best of my knowledge. This method required the strip of metal to be mechanically enwrapped about the tube in the first step of the process, after which the entire structure was dipped in a molten metal bath to cause the helical U-shaped strip to be secured to the tube. Obviously the disadvantages of this method lie in its slowness, the difficulty of achieving a completely homogeneous connection, the inability of the heat exchanger to operate at temperatures higher than the melting point of the soldering medium, and the likelihood of formation of built-up metal upon the heat exchanger because of the metal bath, decreasing the ability to transfer heat.

The invention herein also eliminates the disadvantages of this method.

The invention is characterized principally by the provision of a method of producing heat exchange apparatus comprising finned tubing in which the fins or extended surfaces of the tubing are formed through the homogeneous and completely intimate bonding of at least one strip of metal, preformed to a substantially U-shaped configuration, in a continuous helix upon the primary surface of the said tubing; the important features and advantages of the invention being achieved by reason of the execution of the method in a continuous production manner, in a single pass of the tubing through the appropriate apparatus applying the strip (or strips), economically, efficiently, and at a relatively high speed through the use of resistance welding.

The method of the invention is practiced in various manners, refinements and modifications of which are contemplated, and other objects of the invention are concerned with the achievement of the salutary results of the invention through the use of these modified forms of the invention, either together with the simplest form of the method which will be described, or in lieu thereof.

Several examples of such modifications might be alluded to at this point. A highly effective step in the method of the invention comprises enwrapping the U-shaped strip helically about the tube to which the same is being welded for a substantial distance prior to its coming into engagement with the welding electrode or electrodes, and this expedient applies equally as well to a form of the method in which two or more side by side strips are simultaneously welded helically about the tubing. Another step which results in an excellent weld and is a feature of one form of the invention comprises applying the strip to the tubing by means of two rollers arranged close together and substantially side by side, one roller comprising a welding electrode and the other constituting an electrical return contact roller, so that the path in the tubing along which the welding current flows is as short as possible.

As stated above, the invention may be practiced by simultaneously welding a plurality of U-shaped strips helically upon the tube, with the strips arranged parallel with one another and with the welding rollers arranged generally side by side whereby to simultaneously resistance weld the respective strips upon the tubing.

It should thus be appareciated that the achievement of the beneficial results through these various forms of the invention comprise important objects of the invention, but that many objects and features cannot be specifically set forth in the interests of keeping the specification concise. Those skilled in this art will recognize and appreciate advantages and attributes of the invention in addition to those stated above as a full description of certain preferred forms of the invention are set forth hereinafter.

In connection with the descriptions, various illustratrations are used in which the same characters of reference are applied to the same or equivalent elements or structures where possible.

In the drawings:

Fig. 1 is a perspective diagrammatic view of a reel of metal strip suitable for use with the invention, the metal strip adapted to be continuously drawn from the reel and formed into a U-shaped configuration prior to application to the tubing.

Fig. 2 is a cross sectional diagrammatic representation of a single strip of U-shaped metal applied to the exterior of a section of tubing, the same being used to explain the nature of the invention, and hence, only a single strip being shown. Obviously the completed heat exchanger will comprise a plurality of sections side by side since the strip is wound about the tubing in a helix of slight pitch to bring the strips closely together, as will be explained.

Fig. 3 is a fragmentary sectional diagrammatic view of a section of tubing having U-shaped helical strip welded thereto and illustrating the manner of application of the electrodes, portions of the illustration being shown in elevation.

Fig. 4 is a fragmentary elevational view of a heat exchange member formed with the method of the invention, but in which two U-shaped strips of metal have been welded side by side in a double helix.

Figure 7:
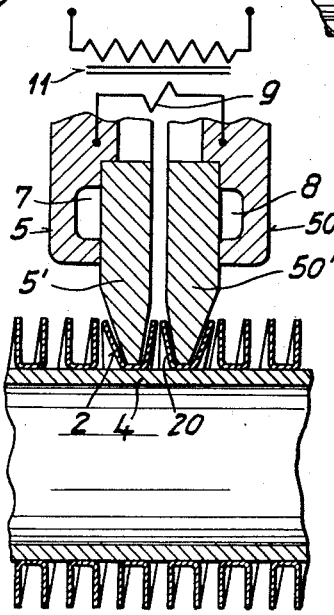
Fig. 7 is a fragmentary sectional diagrammatic view similar to that of Fig. 5, but using a different form of electrodes.

Fig. 8 is a fragmentary sectional diagrammatic view through a length of tubing having a double helix of substantially U-shaped metal strip resistance welded thereto by means of roller electrodes similar to those of Fig. 7, although slightly modified in structure, but in this instance the electrodes are disposed on diametrically opposed sides of the tube, as contrasted with the side by side disposition of the roller electrodes of Fig. 7.

Fig. 9 is a diagrammatic view of extended surface heat exchanger tubing being formed in accordance with a still further modified form of the invention, various parts being illustrated in section and still others being shown in elevation.

Fig. 10 is a transverse sectional view through the finned tubing of Fig. 9 on the line X—X.

Fig. 11 is a block diagram of typical apparatus used to apply the strip to the tubing, also illustrating the method.

In Fig. 1 there is illustrated a reel 1 of metal strip 2' which is suitably journalled for rotation to the end that the strip may readily be drawn from the reel. It will be seen that the dimension of importance comprises the width of the strip designated $a$. The strip is passed through any suitable forming means F (see Fig. 11) to cause the same to assume a U-shaped configuration, such as a rolling mill or through a die or series of dies. The forming means may take many different well-known forms, and may be done in one or more steps with various other processes interspersed, such as, for example, heating, annealing, pickling or de-greasing to prepare same for welding, and the like. All or any of these processes may be performed by apparatus designated C in Fig. 11. The result comprises a U-shaped continuous strip 2, such as shown in Fig. 2, having a pair of side flanges 3 and an integral base 3'. According to the invention, the base 3' is adapted to be intimately and homogeneously resistance welded to the outer surface of a length of tubing 4 which carries a fluid of one temperature, usually much higher than the external fluid or lower than the external gas which will be directed to impinge on the exterior of the tubing 4 and the extended or secondary heat exchange surfaces thereof, which in this case comprise the side flanges 3.

The configuration of the U-shaped strip 2, as shown in Fig. 2, is the preferred final form of the structure, with the side flanges 3 formed at right angle to the base 3' which is preferably welded over its entire surface to the exterior of the tubing 4. It will be appreciated, however, that the designation "U-shaped" or "substantially U-shaped" is intended to include strip derived from reels of flat strip such as 2' which have been formed into generally U-shaped configuration, with the sides not necessarily parallel, but diverging, as for example the strips being engaged by the electrodes in Figs. 7 and 8. Such metal strips may be shaped during the welding process, or after welding so that the final configuration is as shown in Fig. 2.

The dimension $a$ will obviously be chosen to equal the dimension $b$ of Figs. 2 and 3 plus twice the radial dimension of the side flanges 3. Considerations of space, type of material, workability, rate of heat transfer, temperatures, fluids involved, and to some extent the nature of the resistance welding process will control these dimensions. It may be presumed that they will be chosen for maximum heat transfer efficiency when serving in a given piece of apparatus.

Reference to the nature of the resistance welding process above mentioned is intended to indicate that some importance must be attached to the path which the welding current will be required to take during the process, to the construction and arrangement of the electrodes, and to other considerations which will be mentioned. The method described is directed primarily to the setting up of conditions under which the best resistance welding can be done with roller electrodes upon this type of structure in a continuous high speed production manner.

The conventional concept of resistance welding requiring electrodes opposing one another with the workpiece between is not readily applicable to the type of welding which must here be accomplished. The current path which would be occasioned by using a current-carrying mandrel on the interior of the tube would be disadvantageously extended and spread. The invention contemplates that the apparatus used will provide one or more contact rollers in the immediate vicinity of the actual welding electrode to provide as short a current path as possible.

Another problem which must be considered is the oxidation which accompanies high current contact at the surface of the tubing other than the actual welding area. This occurs under conditions where the so-called contact electrodes engage the surface at areas which are substantially equal to or less than the area engaged by the welding roller electrode upon the strip which is being bonded to the tubing. The high current at the contact area produces the burning of the surface of the tubing, which will thereafter be required to have the strip welded thereto, and it is difficult, if not impossible, to weld two surfaces together by resistance welding where one or both have surface oxidation. Thus, in order to avoid this, I use one or more contact electrodes whose combined area of engagement with the surface of the tubing is substantially greater than the area of engagement of the welding electrode with the strip being welded to the tubing. This decreases the current density over the contact area and keeps oxidation to a minimum. It will be seen that the manner in which this is accomplished is ingenious and certainly not obvious.

In Fig. 3 there is illustrated a diagrammatic representation of a length of tubing having the U-shaped strip 2 resistance welded thereto according to the invention. The strip 2 is helically wound upon the exterior surface of the tubing 4 with a slight pitch whose dimensions are chosen so that the distance between the juxtaposed side flanges 3 of adjacent turns of the helix are separated by the distance $b$ which is the distance between the side flanges of the strip. It will be recalled that this distance was chosen on the basis of maximum heat transfer efficiency.

The clean strip 2 is led from the reel 1 through suitable motor driven forming means F and strip treatment apparatus $c$ to the tube and engaged with the tube directly at the point where it is welded in place, namely, directly to the annular flange 5' of the welding electrode 5. This electrode is in the form of a roller, suitably journalled in a manner not shown, for rotation in contact with the surface of the tubing 4 and having the base 3' of the U-shaped strip 2 sandwiched between its outer peripheral edge and the said tube surface. The contact electrode 6 preferably comprises a roller coaxially journalled with the roller 5, and having a substantially greater contact area on its peripheral edge as shown at 6' and which engages the surface of the tubing 4 immediately adjacent the flange 5', the only requirement for the spacing $s$ being that there is sufficient axial distance to permit the passage of the side flange 3 of the section of strip 2 being welded without electrical contact.

The entire bottom surface of the base 3' is intimately and homogeneously welded to the surface of the tubing 4 in the helical configuration, and this is a continuous weld and renders the resulting joint substantially identical with the composition of the tubing 4 itself. To accomplish this, there is required to be relative movement between the electrode roller 5 (together with the roller 6, since the two are preferably mounted as a unit to rotate together) and the tubing 4. This movement includes a longitudinal component in the direction of the axis of the tubing 4, and a rotative component about the said axis. These two movements are indicated by arrows, I being the rotative component, and II the longitudinal component.

While the tubing conceivably could be fixed and the welding unit (5 and 6) arranged to move relative to the same, the preferable and more economical manner of accomplishing this is to support the tubing 4 in some manner S and apply the rotative and longitudinal movement to the tubing 4 so that the axis of the welding unit (5 and 6) may be fixed. This latter expedient thus enables the reel 1, the forming means F, suitable guide means G, pressure rollers PR, and the like to be fixed while the strip is being fed to the welding zone.

Reference is made to pressure rollers PR and forming means F both operating upon the strip, as shown in Fig. 11. In some instances it may be desirable and/or convenient to apply the strip to the tubing mechanically, that is, in engagement with the surface of the tubing 4 without welding, for a substantial distance which may be part of a turn or even more than a turn. This would require means to press the strip against the tubing and hold the same in place ready for the welding step, and this may be accomplished by pressure rollers PR suitably positioned to hold the strip. The movement of the tubing may, for example, carry the mechanically engaged helix through suitable helical guides which accurately align the strip in preparation of the welding thereof. Such guides might also serve additionally to form the strip which usually will distort during the winding process, by spreading the side flanges to somewhat conical configurations. Such guides and/or forming means, as well could be positioned relative the tubing 4 after prior or during the welding has taken place, in order to re-align the U-shaped strips if distorted for the welding operation. The profile means 14, as of Fig. 9, is an example of this.

Note that the roller electrode 5 has its body enlarged radially inward of the annular flange 5' and this enlarged formation is offset laterally away from the end adjacent which the electrode 6 is disposed. The enlargement 7 is for improvement of cooling of the welding flange 5' and to that end preferably is hollow as shown. The roller electrode 6 has a cooling recess 8 on its interior as well. The rollers 5 and 6 may be so mounted that they can readily be moved away from and against the workpieces, any suitable contrivance for accomplishing this being readily built by those skilled in this art. Obviously the welding unit 5, 6 must apply pressure against the tubing 4 in the direction of a radial line of the tube during the welding operation. The electrodes 5 and 6 are connected across the secondary winding 9 of a suitable welding transformer 11 which will supply the necessary current for resistance welding. Since the electrodes are quite close to one another, the current path will be very short, all current passing through the wall of the tubing 4 immediately adjacent the contact zones of the electrodes as shown by the broken lines in Fig. 5.

While I have stated that the preferred arrangement is for the roller electrodes 5 and 6 to be journalled on a common axis, obviously their axes may be circumferentially displaced from one another relative the axis of the tubing 4. The area of contact of the electrode 6 may be decreased in the event its contact path along the surface of the tubing 4 is such that it will not thereafter be superimposed by the welded strip 2. Surface oxidation will have little effect in this case upon the results of the welding.

Figure 5:
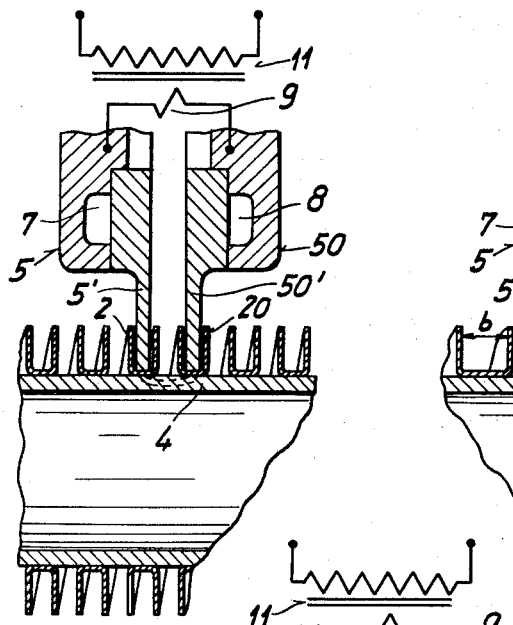
Fig. 5 is a fragmentary sectional diagrammatic view through the finned tubing of Fig. 4 illustrating the manner in which the resistance welding roller electrodes are used to apply the double helix of U-shaped metal for achieving a heat exchanger having a maximum heat transfer efficiency.

As mentioned previously, the invention is of sufficient scope to include a method in which more than one metal strip 2 is applied. Thus two or three helices may be generated about the tubing by applying two or three strips at the same time. Obviously the pitch of these helices will be increased, although there need be no sacrifice in close spacing. As an example of this, Figs. 4 and 5 illustrate the results of such a method and the manner in which it is accomplished. In Fig. 4 there is illustrated a section of tubing 4 which has two U-shaped metal strips 2 and 20 resistance welded thereto, the strips having been applied side by side and with a pitch approximately twice that which would be required if only one strip had been welded.

The two strips 2 and 20 may be applied simultaneously by means of side by side arranged electrodes 5 and 50 as shown in Fig. 5 whereby a multiple threaded helix is generated by means of the proper relative movement of the tubing 4 and the application of the two strips.

In Fig. 5, as well as Figs. 6, 7, 8, and 9, the roller electrodes 5 and 50 are formed with removable contact members preferably in the form of discs suitably secured to the body of the roller so that the contact flanges may be readily replaced or re-shaped when worn. No further comment on this particular structure need be made.

In Fig. 5 it will be seen that the strips 2 and 20 to the left of the peripheral flanges 5' and 50' have been permanently welded in position, while those to the right have merely been engaged about the tubing 4 and are held in position preparatory to welding by any suitable means such as guides and/or pressure rollers suitably positioned. The electrodes 5 and 50 are connected across the secondary winding 9 of a suitable welding transformer 11 which supplies the current, and the path taken by the welding current through the tubing 4 is shown in broken lines.

Figure 6:
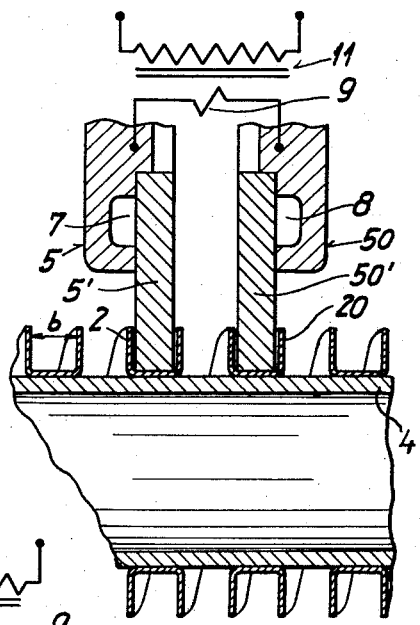
Fig. 6 is a fragmentary sectional view substantially the same as that of Fig. 5 but illustrating a wider spacing of the U-shaped members resulting in somewhat less heat transfer efficiency than the structure of Fig. 5.

Fig. 6 illustrates a method of applying a double helix formed from U-shaped strips 2 and 20 where the requirements for maximum heat transfer are not as stringent, or where circumstances permit a wider pitch. The U-shaped strips 2 and 20 here have their dimension $b$ considerably greater than the equivalent dimension of the structures previously described. As such, the thickness of the electrode contact flanges 5' and 50' may be much greater considered in an axial direction than those illustrated in Fig. 5, for example. Here again, note that the strips are mechanically secured to the tubing 4 prior to passing the welding rollers.

Fig. 7 illustrates another form of apparatus for applying the strips 2 and 20 in a double helix and differs from the structure of Fig. 5 in that, obviously, the flanges 5' and 50' of the rollers 5 and 50, respectively are much heavier and hence can more readily carry the welding current and maintain low temperatures. In this case the peripheral edges of the flanges 5' and 50' are tapered, thereby causing the U-shaped strips 2 and 20 to spread while being welded. This change in profile is readily corrected by the use of guide or forming means which re-shape the strips 2 and 20 immediately following welding. Note that the tapers on the opposite sides of each flange 5' and 50' are not necessarily symmetrical to enable the rollers to be brought quite close together without danger of contact and to prevent interference between juxtaposed side flanges 3 of the side by side welded strips at their welding zones.

As thus far illustrated, the electrodes of the welding units are arranged side by side, preferably journalled on the same axis, but, as stated, the axes of the electrodes may be circumferentially displaced from one another.

In Fig. 8, for example, there is illustrated apparatus in which the electrodes 5 and 50 are diametrically positioned, so that the welding occurs on opposite sides of the tubing simultaneously. The arrangement eliminates crowding of equipment, and enables the peripheral contact flanges 5' and 50' to be tapered symmetrically. Note that the strips 2 and 20 to the right of the welding electrodes 5 and 50 are partially enwrapped mechanically about the tubing 4 in preparation for the welding step. The electrodes 5 and 50 are connected to opposite ends of the secondary 9 of the welding transformer 11 and obviously the welding current will be required to pass through the walls of the tubing 4 approximately 180° about the same.

As in the case of the method of Fig. 7, means for re-shaping the strips 2 and 20 must be provided following the welding step. The spread configuration of the strips 2 and 20 may be applied to the flat strip 2' so that the initial forming operation is not as difficult, whereby the deformation has already occurred when the strips are applied to the tubing 4.

In Figs. 9 and 10 the application of the invention to a novel form of welding strips to the tubing 4 is shown which does not utilize the completely intimate type of weld described, although substantially the same apparatus is used. In this case, the strips 2 and 20 have a U-shaped configuration which is rounded on its base 3' instead of flat as previously described. The distance $b'$ between the side flanges of the strips 2 and 20 initially is substantially greater than the desired distance $b$. The contact flanges 5' and 50' of the electrodes 5 and 50 are thus considerably wider than would otherwise be required, and the peripheral contact edges may be rounded to conform to the profile of the strips 2 and 20. The tubing 4 is provided with helical lines of projections or protuberances 12 which provide thereby recesses 13 between protuberances.

During the welding process the current is applied to the electrodes 5 and 50 from the secondary 9 of the transformer 11 in the same manner as previously described, but the welding takes place along the lines of projections 12 in the wellknown manner of projection welding.

The concentrated currents produced thus heat the metal faster and hence enable this welding process on substantially the medial basic line of projections 12 to be carried on at a rapid rate. The projections spread during the welding process so that the result is that the strips 2 and 20 are secured by a bond which is like a continuous seam weld. This method permits a more economic i.e., faster, welding speed.

After the welding has been accomplished, the strips 2 and 20 are spaced quite close together, and the movement of the tube will carry the strips through a profile head 14 which will bend the side flanges 3 to the desired configuration shown on the left hand end of Fig. 9. Note that the contact flanges 5' and 50' are capable of being made much heavier because of the increased width $b'$ of the strips.

I have shown in Fig. 11 a block diagram to illustrate the apparatus used in carrying out my method. A typical system is shown in which the flat strip 2' leaves the reel 1, passes through some kind of motor driven forming means F which imparts the U-shaped configuration 2 thereto, and thence may pass through apparatus C to de-grease or pickle or otherwise treat the strip chemically or mechanically to promote good welding. Note that the strip is now shown passing through guide means G, but this merely represents such means placed anywhere along the path of the strip, even after the strip has been applied to the tubing 4, and might be combined with forming means, such as, for example, the profile head 14 of Fig. 9. The tubing 4 is shown supported by some support means S which may be a chuck or collet or other structure enabling the tubing to be moved in the manner previously described, that is, with a combined longitudinal and rotative movement. The tubing is shown in sectional view in Fig. 11, and means are shown to actually drive the same, said means being designated TD. The drive for the tubing may be applied to suitable mechanism carried by the support, or may be applied directly to the tubing 4 itself. In the block diagram, it is presumed that rotative movement for the tube drive TD is supplied by an electric motor such as would receive power from a power line.

Pressure means may be used to hold the strip 2 in position on the tubing such pressure means usually taking the form of pressure rollers PR of which there may be several. The welding electrodes 5, 6 and/or 50 are shown in engagement with the tubing 4 at the welding zone or zones. The welding electrodes as explained comprised rollers which are usually capable of being raised and lowered in order to set up the apparatus, and apply the necessary pressure, and also might be rotated under power. The means for moving the roller electrodes are designated ED in Fig. 11 and may include electric motors powered from a line. The welding electrodes are energized from a transformer 11 which may be associated with suitable control means WC and also energized from the power line.

The apparatus illustrated in Fig. 11 shows the application of only a single strip, but the elements thereof may be suitably duplicated and modified to enable the welding of multiple helices of strip 2 upon the tubing.

It will be evident that the invention is capable of being practiced with many different variations in the method and in the apparatus used therewith, but without in any way departing from the spirit and scope of the invention as set forth in the appended claims.

I claim:
1. The method of producing finned heat exchange tubing which comprises winding and electrically welding the bottom wall of a continuous U-shaped strip of metal to the exterior surface of a length of annular cross section tubing in a single pass and in a helical configuration of slight pitch whereby the side flanges of said strip form the extended heat exchange surfaces of said tubing.

2. The method as described in claim 1 in which the pitch is approximately twice the distance between said side flanges whereby the distance between adjacent strips is substantially equal to the distance between said side flanges and the heat exchange fins are uniformly spaced axially along said tubing surface.

3. The method of producing finned heat exchange tubing as claimed in claim 1 in which the said side flanges of said U-shaped strip are divergent, at least immediately after having been welded in position, in which said flanges are bent to normal relative to the said bottom wall thereafter.

4. The method of producing finned heat exchange tubing as claimed in claim 1 in which the configuration of the side flanges is changed immediately before and after welding.

5. The method of producing finned heat exchange tubing which comprises winding and electrically welding the bottom walls of a plurality of similar continuous U-shaped strips of metal to the exterior surface of a length of annular cross section tubing in a single pass and in a spaced apart side by side helical configuration of slight pitch whereby the side flanges of said strips comprise the extended heat exchange surfaces of said tubing and the distance between adjacent strips is substantially equal.

6. The method as claimed in claim 5 in which there are two strips and only one electrode for each strip, and the strips are welded with a side by side spacing substantially equal to the distance between the side flanges of each strip and in helices whose pitch is substantially four times the distance between side flanges so that the side flanges are uniformly spaced along the length of said tubing.

7. The method of producing finned heat exchange tubing which comprises leading a continuous strip of metal of substantially U-shaped configuration to the surface of an elongate cylindrical heat exchange tubing member, engaging the strip upon the tubing surface with the bottom surface of the strip engaged against said tubing surface, engaging at least a pair of electrodes to said tubing surface with the entire width of the bottom wall of said strip sandwiched between one of said electrodes and said tubing surface, applying welding current and pressure to said bottom wall, and causing movement of the tubing relative to the electrodes while applying pressure and welding current carrying the tubing longitudinally of its axis in one direction and simultaneously rotatively about its axis, whereby to cause the strip to be electrically welded to the tubing in a single continuous pass with said strip forming a helical configuration on said tube, said helical configuration having upstanding continuous heat exchange walls forming segments along a pitch line which are each spaced apart along said line.

8. The method of producing finned heat exchange tubing which comprises leading a pair of continuous strips of metal of the same substantially U-shaped configuration to the surface of an elongate cylindrical heat exchange tubing member, engaging the strips upon the tubing surface, engaging a pair of roller welding electrodes to the respective bottom walls of said strips to sandwich said bottom walls between said respective electrodes and said surface, applying welding current and pressure to said electrodes and effecting a continuous helical movement of said tubing member relative to said electrodes whereby to continuously weld said strips to said surface in a continuous pass to said tubing.

9. The method of producing finned heat exchange surfaces as claimed in claim 8 in which the welding electrodes are arranged side by side to cause said welding of said strips side by side, and the electrodes spread said strips during the welding process, in which said strips are re-formed after welding.

10. Apparatus for producing finned heat exchanger tubing in a continuous process which comprises, means for supporting a length of cylindrical tubing and imparting a combined lengthwise and rotative movement thereto, a pair of roller electrodes adapted to be brought into engagement with said length of tubing, means guiding a U-shaped strip of metal to said tubing and beneath one of said electrodes, the peripheral edge of said one electrode being of a width substantially the same as the width of the bottom wall of said U-shaped strip of metal whereby to press said bottom wall against said length of tubing, and means for applying welding current to said electrodes to weld said strip helically to said length of tubing, said guiding means applying said strip to said tubing a substantial number of degrees prior to welding, and pressure means for holding said strip in position partially enwrapped about said length of tubing preparatory to welding.

11. Apparatus as claimed in claim 10 in which the said one electrode has its peripheral edge of a configuration to spread said U-shaped strip and means are provided to re-shape said strip after welding.

12. Apparatus for producing finned heat exchanger tubing in a continuous process which comprises, means for supporting a length of cylindrical tubing and imparting to the said tubing a movement which has one component lengthwise of the axis and another component rotative about said axis, a pair of roller electrodes adapted to be brought into engagement with said length of tubing and having means for applying welding current to said electrodes for resistance welding, means guiding two U-shaped strips of metal to said tubing and engaging same about said tubing in a double helix with one electrode engaging each helix whereby both helices are welded with only said pair of roller electrodes, the spacing between helices being substantially the width of each strip, means for pressing said helices against said tubing and holding the same in position thereon, the welding electrodes being engaged each with its peripheral edge in the respective strips to sandwich the bottom wall of the respective strips between itself and the tubing, the engaged edge of said electrodes being substantially of the same width as the bottom walls of said strips.

13. The method of producing finned heat exchange tubing which comprises leading a pair of continuous strips of metal of the same substantially U-shaped configuration to the surface of an elongate cylindrical heat exchange tubing member, engaging the strips upon the tubing surface, engaging a pair of roller welding electrodes to the respective bottom walls of said strips to sandwich said bottom walls between said respective electrodes and said tube surface with said welding electrodes positioned on diametrically opposite sides of said tubing member, applying welding current and pressure to said electrodes whereby the welding of the respective strips takes place on said opposite sides of the said tubing member, and effecting a continuous helical movement of said tubing member relative to said electrodes whereby to continuously weld said strips to said surface in a continuous pass of said tubing.

14. Apparatus for producing finned heat exchange tubing in a continuous process which comprises, means for supporting a length of cylindrical tubing and imparting to the said tubing a movement which has one component lengthwise of the axis and another component rotative about said axis, a pair of roller electrodes adapted to be brought into engagement with said length of tubing and positioned on opposite sides of said length of tubing and having means for applying welding current to said electrodes for electric welding, means for guiding two U-shaped strips of metal to said tubing and engaging same about said tubing in a double helix, the spacing between helices being substantially the width of each strip, means for pressing said helices against said tubing and holding the same in position thereon, the welding electrodes being engaged each with its peripheral edge in the respective strips to sandwich the bottom wall of the respective strips between itself and the tubing, the engaged edge of said electrodes being substantially the same width as the bottom walls of said strips.

15. The method of producing finned heat exchange tubing which comprises, positioning a welding electrode against the bottom wall of a U-shaped strip whose said bottom wall is being enwrapped in a helix around the exterior wall of a tubing member, and positioning another electrode with respect to said tubing member at a position which does not encounter said strip whereby oxidation effects from resistance welding the bottom wall of the U-shaped strip of metal to the exterior surface of said tubing member are minimized during the welding of said strip on said tubing member in a single pass and in a helical configuration of slight pitch, the side flanges of said strip forming the extended heating exchange surfaces of said tubing.

16. The method of producing finned heat exchange tubing which comprises, positioning a pair of electrodes against the bottom wall of a U-shaped strip of metal which is enwrapped on the exterior surface of a tubing member with the area of current contact between said tubing and said strip exceeding the area of contact between said electrodes and said strip whereby oxidation effects on said tubing are minimized during the resistance welding of said strip to said tubing member in a single pass and in a helical configuration of slight pitch, the side flanges of said strip forming the extended heating exchange surface of said tubing.

17. A method of producing finned heat exchange tubing which comprises electrically welding the bottom wall of a continuous U-shaped strip of metal to the exterior surface of a length of annular cross-section tubing in a single pass and in a helical configuration of slight pitch whereby the side flanges of said strip form the extended heat exchange surfaces of said tubing, said strip of metal being partially wrapped about the tubing and mechanically held in said helical configuration for at least a portion of a turn prior to welding the same, while said wrapping step occurs continuously and simultaneously with said welding.

18. The method of producing finned heat exchange tubing which comprises electrically welding the bottom walls of a plurality of similar continuous U-shaped strips of metal to the exterior surface of a length of annular cross-section tubing in a single pass and in side by side helical configuration of slight pitch whereby the side flanges of said strips comprise the extended heat exchange surfaces of said tubing and the distance between adjacent strips is substantially equal and in which portions of said strips are mechanically wrapped about said tube and held in position preparatory to welding for at least a portion of a turn, the wrapping and holding occurring simultaneously with said welding and without interrupting the continuity thereof.

19. Apparatus for producing finned heat exchange tubing comprising means for simultaneously winding a pair of continuous metal strips each having a substantially U-shaped configuration to the surface of an elongate cylindrical heat exchange tube, a pair of electrodes, each electrode engaged with a respective wall of each strip, and means for applying electrical current to said electrodes while simultaneously effecting the winding of said strips upon said tube with said electrical current passing between said electrodes.

20. The arrangement claimed in claim 19 in which said electrodes are each arranged to enlarge the opening between the legs of each U-shaped strip whereby said electrodes may engage the respective bottom walls to provide maximum current and heat transfer thereto, and means for thereafter reshaping said side walls to decrease the opening therebetween.

References Cited in the file of this patent

UNITED STATES PATENTS

| | | |
|---|---|---|
| 1,172,301 | Murray et al. | Feb. 22, 1916 |
| 1,972,230 | Lehman | Sept. 4, 1934 |
| 2,070,539 | Muhleisen | Feb. 9, 1937 |
| 2,174,928 | Riemenschneider et al. | Oct. 3, 1939 |
| 2,344,790 | Schryber | Mar. 21, 1944 |
| 2,376,762 | Ferguson | May 22, 1945 |
| 2,449,840 | Brown | Sept. 21, 1948 |
| 2,550,965 | Brown | May 1, 1951 |
| 2,826,672 | Brown et al. | Mar. 11, 1958 |